US010797512B2

(12) United States Patent
Tamai (10) Patent No.: US 10,797,512 B2
(45) Date of Patent: Oct. 6, 2020

(54) UNINTERRUPTIBLE POWER SUPPLY (71) Applicant: FUJI ELECTRIC CO., LTD., Kawasaki-shi, Kanagawa (JP)

(72) Inventor: Yasuhiro Tamai, Hino (JP)

(73) Assignee: FUJI ELECTRIC CO., LTD., Kawasaki-Shi, Kanagawa (JP)

(*) Notice: Subject to any disclaimer, the term of this patent is extended or adjusted under 35 U.S.C. 154(b) by 82 days.

(21) Appl. No.: 16/260,814

(22) Filed: Jan. 29, 2019

(65) Prior Publication Data

US 2019/0157901 A1  May 23, 2019

Related U.S. Application Data (63) Continuation of application No. PCT/JP2017/045929, filed on Dec. 21, 2017.

(30) Foreign Application Priority Data

Feb. 16, 2017 (JP) .................. 2017-026928

(51) Int. Cl.
H02J 9/06 (2006.01)
H02J 7/00 (2006.01)
H02J 7/02 (2016.01)
H02M 7/48 (2007.01)

(52) U.S. Cl.
CPC ............. *H02J 9/06* (2013.01); *H02J 7/007* (2013.01); *H02J 7/02* (2013.01); *H02J 9/062* (2013.01); *H02M 7/48* (2013.01)

(58) Field of Classification Search
CPC ...... H02J 9/06; H02J 7/002; H02J 7/02; H02J 9/062; H02M 7/48
See application file for complete search history.

(56) References Cited

U.S. PATENT DOCUMENTS

2016/0103032 A1  4/2016 Nakano

FOREIGN PATENT DOCUMENTS

| EP | 2 985 857 A1 | 2/2016 |
| JP | H04-281342 A | 10/1992 |
| JP | H07-039088 A | 2/1995 |
| JP | H09-061482 A | 3/1997 |
| JP | 2004-147448 A | 5/2004 |
| JP | 2014-207790 A | 10/2014 |
| JP | 2015-014204 A | 1/2015 |
| JP | 2015-047052 A | 3/2015 |

OTHER PUBLICATIONS

International Search Report PCT/JP2017/045929; dated Jan. 30, 2018; PCT/ISA/210.
Written Opinion by the International Search Authority PCT/JP2017/045929; dated Jan. 30, 2018; PCT/ISA/237.
Japan Patent Office, "Office Action for Japanese Patent Application No. 2018-568021," dated Dec. 3, 2019.

*Primary Examiner* — Robert L Deberadinis
(74) *Attorney, Agent, or Firm* — Manabu Kanesaka (57) ABSTRACT An uninterruptible power supply includes a power converter, a detector that detects a voltage value or a current value, and a controller that controls the power converter based on the detected voltage value or current value and generates one or more command values. The controller compares the one or more command values with predetermined reference values respectively corresponding to the one or more command values.

7 Claims, 6 Drawing Sheets

| ABNORMALITY CONTENT INFORMATION E1 | | ABNORMAL PORTION INFORMATION E5 |
|---|---|---|
| TYPE OF COMMAND VALUE A | COMPONENT OF COMMAND VALUE A | |
| DC AVR COMMAND | ABSOLUTE VALUE | PORTION P1 (CONVERTER CURRENT DETECTOR) |
| | PULSATION | PORTION P2 (CAPACITOR CIRCUIT) |
| CONVERTER CURRENT COMMAND | ABSOLUTE VALUE | PORTION P3 |
| | PULSATION | PORTION P4 |
| CONVERTER ACR COMMAND | ABSOLUTE VALUE | PORTION P5 |
| | PULSATION | PORTION P6 (INPUT FILTER CIRCUIT) |
| CONVERTER VOLTAGE COMMAND | ABSOLUTE VALUE | PORTION P7 |
| | PULSATION | PORTION P8 |
| OUTPUT AVR COMMAND | ABSOLUTE VALUE | PORTION P9 |
| | PULSATION | PORTION P10 |
| INVERTER VOLTAGE COMMAND | ABSOLUTE VALUE | PORTION P11 |
| | PULSATION | PORTION P12 |
| INVERTER VOLTAGE CORRECTION COMMAND | ABSOLUTE VALUE | PORTION P13 |
| | PULSATION | PORTION P14 (OUTPUT FILTER CIRCUIT) |
| FINAL INVERTER VOLTAGE COMMAND | ABSOLUTE VALUE | PORTION P15 |
| | PULSATION | PORTION P16 |
| DC AVR COMMAND | ABSOLUTE VALUE | PORTION P17 (CHOPPER CURRENT DETECTOR) |
| | PULSATION | PORTION P18 (CAPACITOR CIRCUIT) |
| CHOPPER CURRENT COMMAND | ABSOLUTE VALUE | PORTION P19 |
| | PULSATION | PORTION P20 |
| CHOPPER ACR COMMAND | ABSOLUTE VALUE | PORTION P21 |
| | PULSATION | PORTION P22 (CHOPPER FILTER CIRCUIT) |
| CHOPPER VOLTAGE COMMAND | ABSOLUTE VALUE | PORTION P23 |
| | PULSATION | PORTION P24 |

FIG.12

ABNORMALITY OF
INPUT FILTER CIRCUIT
HAS BEEN DETECTED

FIG.13

UNINTERRUPTIBLE POWER SUPPLY

CROSS-REFERENCE TO RELATED APPLICATION

This application is a continuation of PCT application PCT/JP2017/045929, filed on Dec. 21, 2017, which is based upon and claims priority of Japanese patent application No. 2017-026928, filed on Feb. 16, 2017, the entire contents of which are incorporated herein by reference.

BACKGROUND OF THE INVENTION

Field of the Invention

The present invention relates to an uninterruptible power supply including a controller that controls a power converter.

Description of the Background Art

An uninterruptible power supply including a controller that controls a power converter is known in general. Such an uninterruptible power supply is disclosed in Japanese Patent Laid-Open No. 9-061482.

Japanese Patent Laid-Open No. 9-061482 discloses an abnormality detector that detects abnormality of an uninterruptible power supply. This abnormality detector includes an input current waveform detector that detects an input current input to the uninterruptible power supply, an output voltage waveform detector that detects an output voltage output from the uninterruptible power supply, and a waveform comparator. When the detected input current waveform further exceeds a preset allowable range as compared with an input current waveform in the normal state or when the detected output voltage waveform further exceeds a preset allowable range as compared with an output voltage waveform in the normal state, the waveform comparator outputs an abnormal signal. The abnormality detector determines the presence or absence of abnormality of the uninterruptible power supply based on the abnormal signal.

Although the abnormality detector of the uninterruptible power supply disclosed in Japanese Patent Laid-Open No. 9-061482 can determine the presence or absence of abnormality of the entire uninterruptible power supply based on the abnormal signal, the abnormality detector cannot identify an abnormal portion of the uninterruptible power supply. Therefore, in the abnormality detector of the uninterruptible power supply disclosed in Japanese Patent Laid-Open No. 9-061482, it is necessary for an operator to inspect each component in the uninterruptible power supply after an abnormality occurs, and it takes time to identify the abnormal portion.

SUMMARY OF THE INVENTION

The present invention has been proposed in order to solve the aforementioned problem.

In order to attain the aforementioned object, an uninterruptible power supply according to an aspect of the present invention includes a power converter that converts input power into output power, a detector that detects voltage values or current values in interior portions of an uninterruptible power supply body, and a controller that controls the power converter based on the detected voltage values or current values and generates one or more command values. The controller compares the one or more command values with one or more predetermined reference values respectively corresponding to the one or more command values. In this specification, the "command values" indicate variable values to be used in the controller (software) to allow the power converter to output target output power, and the "command values" and the "input power" are distinguished from each other. In addition, the "interior portions of the uninterruptible power supply body" is not limited to only the power converter and the detector but also include each component included in the uninterruptible power supply.

In the uninterruptible power supply according to this aspect of the present invention, as described above, the controller compares the one or more command values with the one or more predetermined reference values respectively corresponding to the one or more command values. Accordingly, it can be determined that an abnormality has occurred in a portion in the uninterruptible power supply body corresponding to a command value in which an abnormality has occurred by determining whether or not the one or more command values are abnormal based on the comparison results. That is, it can be estimated that an abnormality has occurred in the detector that generates the one or more command values or a detection target in which the voltage value or the current value is detected by the detector. Thus, unlike the case in which the presence or absence of an abnormality of the entire uninterruptible power supply is determined based on the input current or the output voltage of the entire uninterruptible power supply, an abnormal portion of the interior portions of the uninterruptible power supply body can be estimated, and thus the abnormal portion of the uninterruptible power supply can be quickly identified. Consequently, even when an abnormality occurs in the uninterruptible power supply, an abnormal portion can be quickly identified, and thus the uninterruptible power supply can be quickly restored from an abnormal state to a normal state.

In the aforementioned uninterruptible power supply according to this aspect, the controller preferably estimates an abnormal portion in the uninterruptible power supply body based on comparisons between the one or more command values and the one or more predetermined reference values. According to this structure, the uninterruptible power supply itself can estimate its abnormal portion, and thus the abnormal portion of the uninterruptible power supply can be identified without providing a device that estimates an abnormal portion separately from the uninterruptible power supply. That is, there is no need for a user or a maintenance worker to estimate the abnormal portion.

In this case, the controller preferably estimates the abnormal portion in the uninterruptible power supply body based on a table in which the one or more command values and abnormal portions in the uninterruptible power supply body corresponding to the one or more command values are associated with each other and the one or more command values indicating abnormalities among the one or more command values. According to this structure, by using the table, abnormal portions corresponding to the one or more command values indicating abnormalities can be easily and quickly estimated without performing complex calculation, for example.

The aforementioned uninterruptible power supply in which the abnormal portion in the uninterruptible power supply body is estimated based on the comparisons between the one or more command values and the one or more predetermined reference values preferably further includes a display that displays the abnormal portion in the uninterruptible power supply body estimated by the controller.

According to this structure, the user can visually recognize an image showing the abnormal portion, and thus the user can easily recognize the abnormal portion.

In the aforementioned uninterruptible power supply in which the abnormal portion in the uninterruptible power supply body is estimated based on the comparisons between the one or more command values and the one or more predetermined reference values, the controller preferably estimates the interior portions of the uninterruptible power supply body corresponding to the one or more command values as abnormal portions when deviations between the one or more command values and the predetermined reference values corresponding to the one or more command values are equal to or greater than a first threshold. According to this structure, by using the first threshold, it can be easily determined whether or not the one or more command values are abnormal values with respect to the one or more predetermined reference values. Furthermore, the deviations between the one or more command values and the one or more predetermined reference values are calculated such that only components (components for determining abnormalities) of the deviations of the one or more command values from the one or more predetermined reference values can be compared with the first threshold. Thus, components other than the components for determining abnormalities are not included, and thus it can be more easily determined whether or not the one or more command values are abnormal values with respect to the one or more predetermined reference values.

In this case, the controller preferably estimates, as the abnormal portions, the interior portions of the uninterruptible power supply body corresponding to pulsating components of the one or more command values when deviations between the pulsating components of the one or more command values and the one or more predetermined reference values corresponding to the pulsating components of the one or more command values are equal to or greater than the first threshold. Here, depending on a portion (component) of the uninterruptible power supply, the pulsating component of the command value may be changed to an abnormal value when an abnormality occurs in that portion. In view of this point, the uninterruptible power supply is configured as described above in the present invention such that when the pulsating components of the one or more command values are abnormal values with respect to the more or more predetermined reference values, it can be estimated that abnormalities have occurred in portions that have changed the pulsating components of the one or more command values to abnormal values when the abnormalities have occurred. Consequently, an abnormal portion of the uninterruptible power supply can be easily identified.

In the aforementioned uninterruptible power supply in which the abnormal portion in the uninterruptible power supply body is estimated based on the comparisons between the one or more command values and the one or more predetermined reference values, the controller preferably stops operation of the power converter when the deviations between the one or more command values and the one or more predetermined reference values become equal to or greater than a second threshold greater than the first threshold after the deviations between the one or more command values and the one or more predetermined reference values become equal to or greater than the first threshold and the controller continues the operation of the power converter. According to this structure, even when an abnormal portion exists in the uninterruptible power supply, the operation of the power converter can be continued when the deviations between the one or more command values and the one or more predetermined reference values are less than the second threshold, and thus an unnecessary stop of the operation of the power converter can be significantly reduced or prevented. When the deviations between the one or more command values and the one or more predetermined reference values are equal to or greater than the second threshold, the operation of the power converter is stopped, and thus the operation of the power converter can be appropriately stopped when the operation of the power converter should be stopped while an unnecessary stop of the operation of the power converter is significantly reduced or prevented.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention are hereinafter described with reference to the drawings.

(Overall Configuration)

The configuration of an uninterruptible power supply (UPS) 100 according to an embodiment is now described with reference to FIGS. 1 to 12. The uninterruptible power supply 100 is an example of an "uninterruptible power supply body" in the claims. In other words, the term "interior portions of the uninterruptible power supply 100" indicates "interior portions of the uninterruptible power supply body" in the claims.

Figure 1:
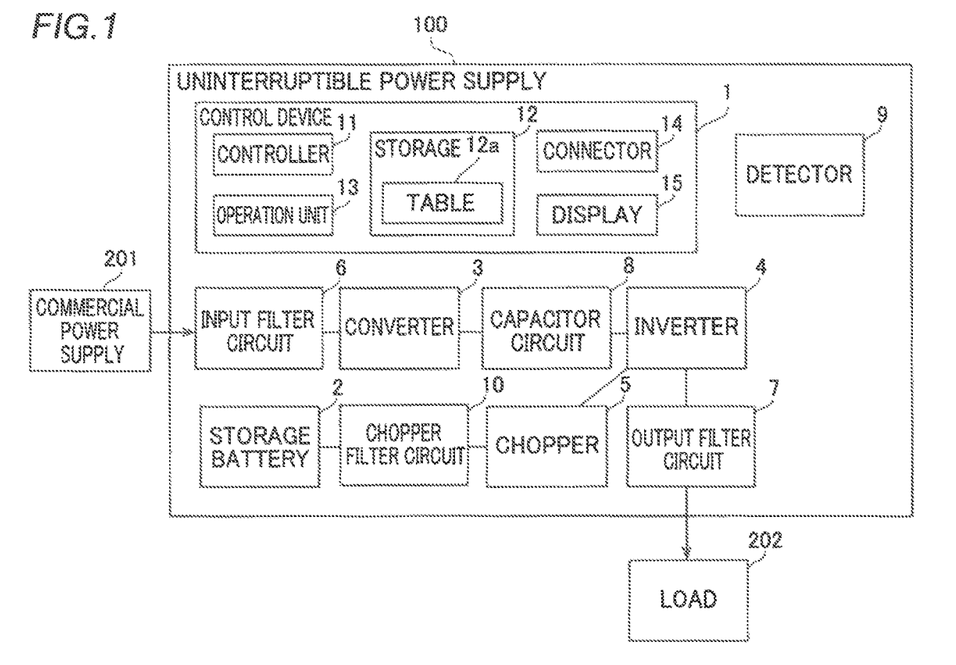
FIG. 1 is a block diagram showing the configuration of an uninterruptible power supply according to an embodiment of the present invention.

As shown in FIG. 1, the uninterruptible power supply 100 includes a control device 1 and a storage battery 2. When power is supplied from a commercial power supply 201, the control device 1 of the uninterruptible power supply 100 supplies the supplied power to a load 202, and when the supply of power from the commercial power supply 201 is stopped (power outage occurs), the control device 1 of the uninterruptible power supply 100 performs control of supplying power from the storage battery 2 to the load 202. Thus, the uninterruptible power supply 100 prevents interruption of power supply to the load 202.

Specifically, the uninterruptible power supply 100 includes a converter 3, an inverter 4, and a chopper 5. The converter 3, the inverter 4, and the chopper 5 are each configured as a power conversion circuit that converts input power input thereto and outputs output power. The converter 3 converts AC power from the commercial power supply 201 into DC power. The inverter 4 converts the DC power supplied from the converter 3 or the chopper 5 into AC power suitable for the load 202. The chopper 5 steps up or steps down the voltage of the power from the storage battery 2 to a voltage usable by the inverter 4 and supplies the power, the voltage of which has been stepped up or stepped down, to the inverter 4. The converter 3, the inverter 4, and the chopper 5 are examples of a "power converter" in the claims.

The uninterruptible power supply 100 further includes an input filter circuit 6 connected to the input side of the converter 3, an output filter circuit 7 connected to the output side of the inverter 4, and a capacitor circuit 8 connected to the output side of the converter 3 and the input side of the inverter 4.

Figure 2:
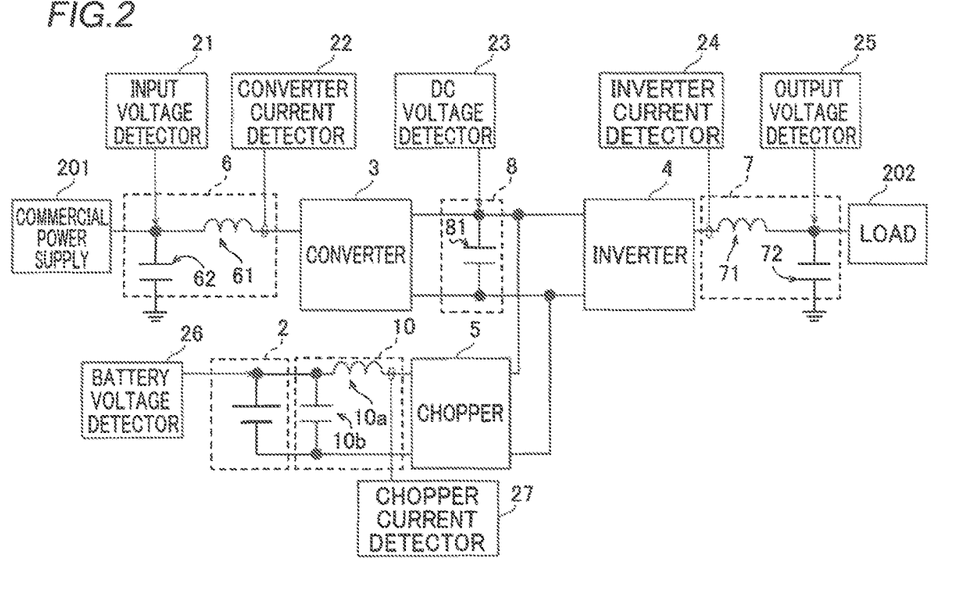
FIG. 2 is a block diagram showing the configuration of interior portions and detectors of the uninterruptible power supply according to the embodiment of the present invention.

As shown in FIG. 2, the input filter circuit 6 is configured as an LC filter circuit, for example, and includes a coil 61 and a capacitor 62. The input filter circuit 6 removes ripple components of power generated from the converter 3. In an example of FIG. 2, an example in which AC power for one phase is supplied is shown for the sake of simplicity of description, but AC power for three phases may be supplied to the uninterruptible power supply 100.

The output filter circuit 7 is configured as an LC filter circuit, for example, and includes a coil 71 and a capacitor 72. The output filter circuit 7 removes high frequency components (ripples) of power output from the inverter 4. The capacitor circuit 8 includes one or a plurality of capacitors 81 in each phase. The capacitor circuit 8 smooths the output power of the converter 3.

A chopper filter circuit 10 is configured as an LC filter circuit, for example, and includes a coil 10*a* and a capacitor 10*b*. The chopper filter circuit 10 removes ripple components of power generated from the chopper 5.

As shown in FIG. 1, the control device 1 includes a controller 11, a storage 12, an operation unit 13, a connector 14, and a display 15. The controller 11 includes a CPU (Central Processing Unit), for example, and controls the operation of each portion of the uninterruptible power supply 100. The storage 12 includes a nonvolatile memory (flash memory), for example, and stores abnormal portion information E5, abnormality occurrence frequency information E2, abnormality occurrence period information E3, a table 12*a*, etc. described below. The operation unit 13 includes a keyboard, a touch panel, etc., receives an input operation from a user or a maintenance worker, and transmits information about the input operation to the controller 11.

The connector 14 is connected to the outside of the uninterruptible power supply 100 to allow communication with an external device. Thus, in the uninterruptible power supply 100, the abnormal portion information E5, the abnormality occurrence frequency information E2, and the abnormality occurrence period information E3 stored in the storage 12 can be retrieved (extracted) via the connector 14 by the external device. The display 15 includes a liquid crystal panel, for example, and can display an image (see FIG. 12, for example) in accordance with a command from the controller 11.

(Configuration of Detector)

The uninterruptible power supply 100 includes a detector 9. The detector 9 detects at least one of a voltage value and a current value of at least one of the input power and the output power of power converters in the uninterruptible power supply 100.

As shown in FIG. 2, the detector 9 includes an input voltage detector 21, a converter current detector 22, a DC voltage detector 23, an inverter current detector 24, an output voltage detector 25, a battery voltage detector 26, and a chopper current detector 27 as an example. The input voltage detector 21, the DC voltage detector 23, the output voltage detector 25, and the battery voltage detector 26 each include a voltage detection circuit. The converter current detector 22, the inverter current detector 24, and the chopper current detector 27 each include a current detection circuit.

The input voltage detector 21 detects the voltage value of the input power input to the converter 3 from the commercial power supply 201 (hereinafter referred to as the "input voltage detection value V1"). For example, the input voltage detector 21 is connected to a positive electrode of the capacitor 62 of the input filter circuit 6.

The converter current detector 22 detects a value of current that flows through the converter 3 (hereinafter referred to as the "converter current detection value I1"). For example, the converter current detector 22 detects a current value at or near the coil 61 of the input filter circuit 6.

The DC voltage detector 23 detects the voltage value of the output power output from the converter 3 (hereinafter referred to as the "DC voltage detection value V2"). Note that the output power output from the converter 3 is also the input power input to the inverter 4. For example, the DC voltage detector 23 is connected to a positive electrode of the capacitor 81 of the capacitor circuit 8.

The inverter current detector 24 detects a value of current that flows through the inverter 4 (hereinafter referred to as the "inverter current detection value I2"). For example, the inverter current detector 24 detects a current value at or near the coil 71 of the output filter circuit 7.

The output voltage detector 25 detects the voltage value of the output power output from the inverter 4 (hereinafter referred to as the "output voltage detection value V3"). For example, the output voltage detector 25 is connected to a positive electrode of the capacitor 72 of the output filter circuit 7.

The battery voltage detector 26 detects the voltage value of the input power input to the chopper 5 from the storage battery 2 (hereinafter referred to as the "battery voltage detection value V4"). For example, the battery voltage detector 26 is connected to a positive electrode of the storage battery 2.

The chopper current detector 27 detects a value of current that flows through the chopper 5 (hereinafter referred to as the "chopper current detection value I3"). For example, the chopper current detector 27 detects the current value of the input power of the chopper 5.

The input voltage detection value V1, the DC voltage detection value V2, the output voltage detection value V3, the battery voltage detection value V4, the converter current detection value I1, the inverter current detection value I2, and the chopper current detection value I3 are examples of a "detection result of the detector" in the claims.

(Configuration of Controller)

<Configuration Related to Control of Power Converters>

Figure 3:
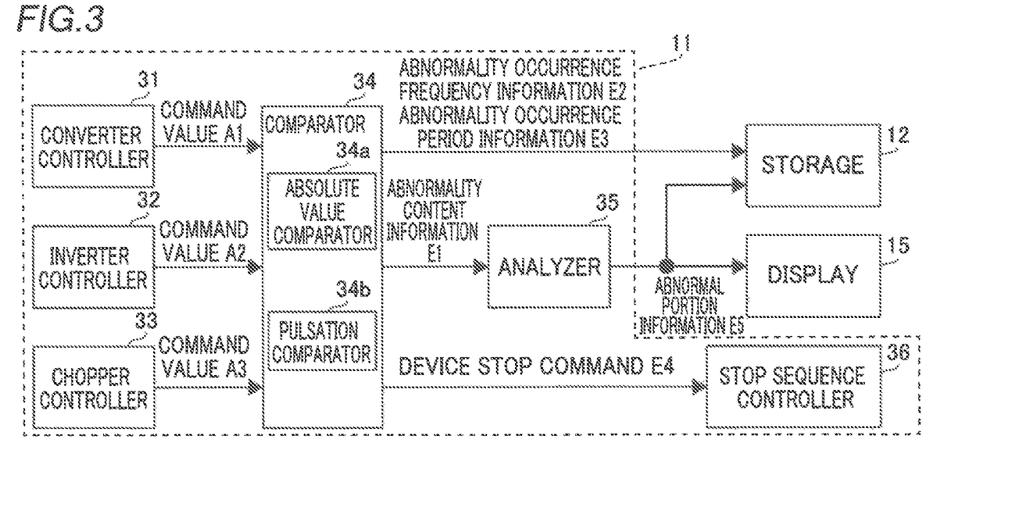
FIG. 3 is a block diagram showing the configuration of a controller according to the embodiment of the present invention.

As shown in FIG. 3, the controller 11 includes a converter controller 31, an inverter controller 32, a chopper controller 33, a comparator 34, an analyzer 35, and a stop sequence controller 36. The converter controller 31 generates a command value A1 to control the operation of the converter 3. The inverter controller 32 generates a command value A2 to control the operation of the inverter 4. The chopper controller 33 generates a command value A3 to control the operation of the chopper 5. In this specification, the "command values A1, A2, and A3" respectively indicate variable values to be used in the controller 11 (software) to allow the converter 3, the inverter 4, and the chopper 5 to output target output power. In the following description, the command values A1, A2, and A3 are simply described as the "command value A" when the same are not distinguished from each other.

Figure 4:
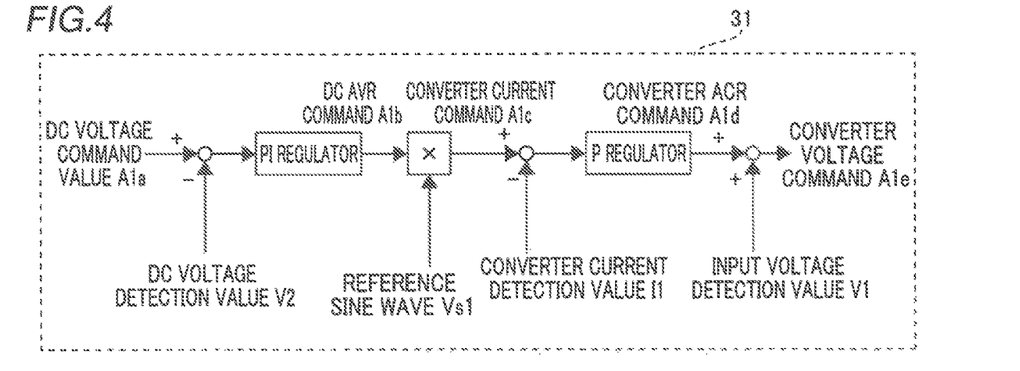
FIG. 4 is a block diagram showing the configuration of a converter controller according to the embodiment of the present invention.
Figure 5:
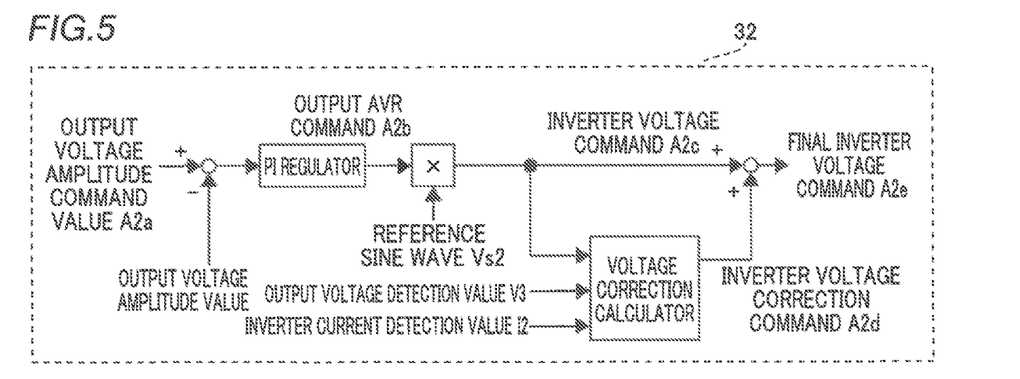
FIG. 5 is a block diagram showing the configuration of an inverter controller according to the embodiment of the present invention.
Figure 6:
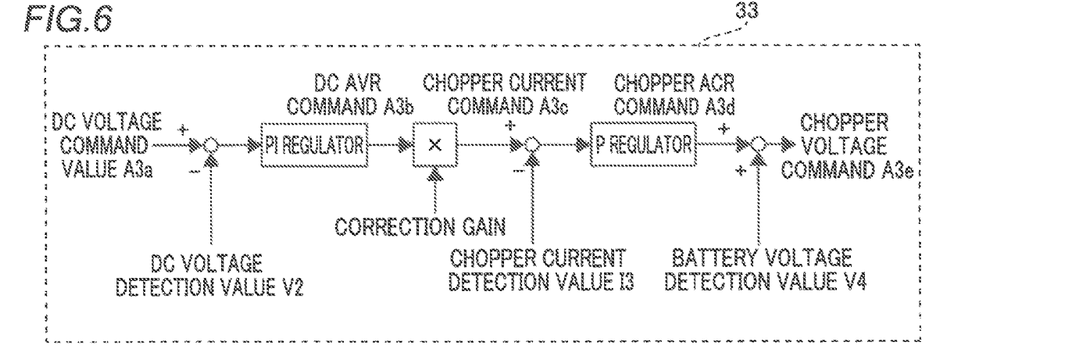
FIG. 6 is a block diagram showing the configuration of a chopper controller according to the embodiment of the present invention.

Specifically, as shown in FIGS. 4 to 6, the converter controller 31, the inverter controller 32, and the chopper controller 33 each perform feedback control to generate the command value A based on the detection result from the detector 9. That is, the controller 11 generates a plurality of types of command value A (A1a to A1e, A2a to A2e, and A3a to A3e) shown below. The configurations of the controllers in FIGS. 4 to 6 are merely examples, and the present invention can be applied even in the case of a different configuration.

More specifically, as shown in FIG. 4, the converter controller 31 generates a DC voltage command value A1a and calculates a deviation between the DC voltage command value A1a and the DC voltage detection value V2. Then, the converter controller 31 calculates a DC AVR command A1b, which is a value calculated by a PI (proportional integral) regulator, based on the deviation between the DC voltage command value A1a and the DC voltage detection value V2. Note that AVR denotes an automatic voltage regulator.

Then, the converter controller 31 generates a converter current command A1c, which is a value obtained by multiplying the DC AVR command A1b by a reference sine wave Vs1. Then, the converter controller 31 calculates a deviation between the converter current command A1c and the converter current detection value I1, and inputs the calculated value to a P regulator (proportional regulator). Then, the converter controller 31 calculates a converter ACR command A1d, which is a value calculated by the P regulator, based on the deviation between the converter current command A1c and the converter current detection value I1. Then, the converter controller 31 generates a converter voltage command A1e, which is a value obtained by adding the input voltage detection value V1 to the converter ACR command A1d. Note that ACR denotes an automatic current regulator. Then, the converter controller 31 generates a switching command from the converter voltage command A1e in order to operate a semiconductor element inside the converter 3, and transmits the switching command to the converter 3 to control the operation of the converter 3.

As shown in FIG. 5, the inverter controller 32 generates an output voltage amplitude command value A2a and calculates a deviation between the output voltage amplitude command value A2a and an output voltage amplitude value calculated from the output voltage detection value V3. Then, the inverter controller 32 calculates an output AVR command A2b, which is a value calculated by a PI (proportional integral) regulator, based on the deviation between the output voltage amplitude command value A2a and the output voltage amplitude value.

Then, the inverter controller 32 generates an inverter voltage command A2c, which is a value obtained by multiplying the output AVR command A2b by a reference sine wave Vs2. Then, the inverter controller 32 inputs the inverter voltage command A2c, the inverter current detection value I2, and the output voltage detection value V3 to a voltage correction calculator, and calculates an inverter voltage correction command A2d, which is a correction value for bringing the output voltage close to the voltage command. Then, the inverter controller 32 generates a final inverter voltage command A2e, which is a value obtained by adding the inverter voltage command A2c to the inverter voltage correction command A2d. Then, the inverter controller 32 generates a switching command from the final inverter voltage command A2e in order to operate a semiconductor element inside the inverter 4, and transmits the switching command to the inverter 4 to control the operation of the inverter 4.

As shown in FIG. 6, the chopper controller 33 generates a DC voltage command value A3a and calculates a deviation between the DC voltage command value A3a and the DC voltage detection value V2. Then, the chopper controller 33 calculates a DC AVR command A3b, which is a value calculated by a PI regulator, based on the deviation between the DC voltage command value A3a and the DC voltage detection value V2.

Then, the chopper controller 33 generates a chopper current command A3c, which is a value obtained by multiplying the DC AVR command A3b by a correction gain. Then, the chopper controller 33 calculates a deviation between the chopper current command A3c and the chopper current detection value I3, and inputs the calculated value to a P regulator. Then, the chopper controller 33 calculates a chopper ACR command A3d, which is a value calculated by the P regulator, based on the deviation between the chopper current command A3c and the chopper current detection value I3. Then, the chopper controller 33 generates a chopper voltage command A3e, which is a value obtained by adding the battery voltage detection value V4 to the chopper ACR command A3d. Then, the chopper controller 33 generates a switching command from the chopper voltage command A3e in order to operate a semiconductor element inside the chopper 5, and transmits the switching command to the chopper 5 to control the operation of the chopper 5.

(Configuration Related to Comparison Between Command Value and Reference Value)

According to the present embodiment, the comparator 34 of the controller 11 shown in FIG. 3 acquires comparison results between each command value A described above (A1b to A1e, A2b to A2e, and A3b to A3e, for example) and reference values B (an absolute value reference value B1 and a pulsation reference value B2) for each command value A.

Specifically, according to the present embodiment, as shown in FIG. 3, the comparator 34 of the controller 11 generates the plurality of types of command value A, and acquires the comparison results between each of the plurality of types of command value A and a plurality of reference values B corresponding to each of the plurality of types of command value A. Then, the comparator 34 transmits comparison results indicating abnormalities among the comparison results of the plurality of types of command value A to the storage 12, the analyzer 35, and the stop sequence controller 36. Note that the comparison results indicating abnormalities are abnormality content information E1, the abnormality occurrence frequency information E2, the abnormality occurrence period information E3, and a device stop command E4, for example.

More specifically, the comparator 34 of the controller 11 is connected to each of the converter controller 31, the inverter controller 32, and the chopper controller 33. Then, the comparator 34 acquires the command value A from each of the converter controller 31, the inverter controller 32, and the chopper controller 33. Note that each portion of the controller 11 in FIG. 3 may be configured as a functional block in one piece of hardware or may be configured as a plurality of pieces of hardware divided for each function. The comparator 34 includes an absolute value comparator 34a (see FIG. 7) and a pulsation comparator 34b (see FIG. 8).

<Configuration Related to Comparison Between Absolute Value of Deviation and Threshold>

Figure 7:
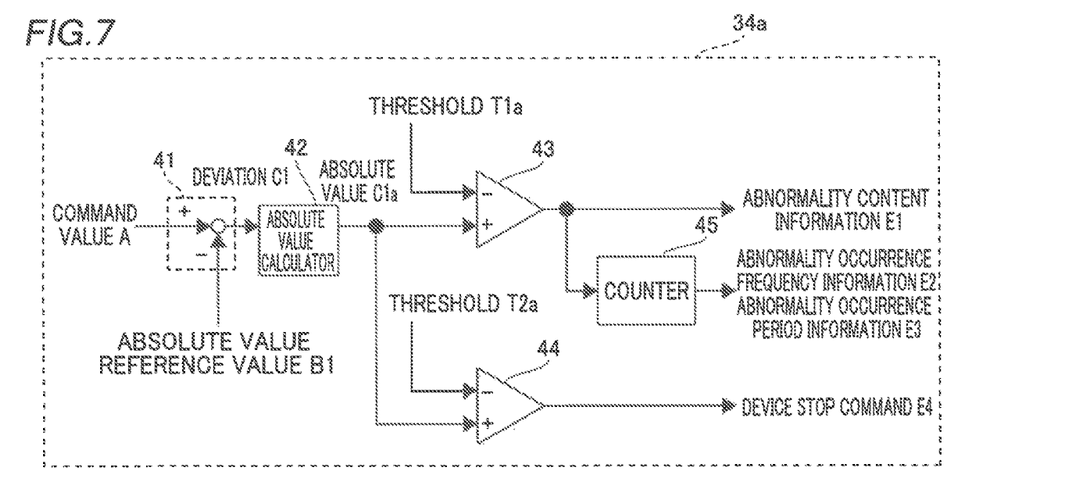
FIG. 7 is a block diagram showing the configuration of an absolute value comparator according to the embodiment of the present invention.

According to the present embodiment, as shown in FIG. 7, the absolute value comparator 34a of the controller 11 performs control of acquiring an absolute value C1a of a deviation C1 between the command value A and the absolute value reference value B1 equal to or greater than a threshold T1a as a comparison result indicating an abnormality. Here, the absolute value reference value B1 may be set as a constant value, or when the command value A is an AC waveform, the absolute value reference value B1 may be set as a sine wave corresponding to the frequency and phase of the command value A. The threshold T1a is an example of a "first threshold" in the claims.

According to the present embodiment, the comparator 34 performs control of stopping the operation of the power converters (the converter 3, the inverter 4, and the chopper 5) when acquiring a comparison result including information indicating that the absolute value C1a of the deviation C1 between the command value A and the absolute value reference value B1 is equal to or greater than a threshold T2a greater than the threshold value T1a. The threshold T2a is an example of a "second threshold" in the claims.

Here, the absolute value reference value B1 and the pulsation reference value B2 described below are determined from the operation (behavior) of the normal uninterruptible power supply 100 (at the time of manufacture, for example) based on a variation range that can be said to be normal (not abnormal). The absolute value reference value B1 and the pulsation reference value B2 are values stored in advance in the storage 12, and are stored at the time of manufacturing the uninterruptible power supply 100, for example. The threshold T1a and a threshold T1b described below are satisfactory for continuing the operation of the uninterruptible power supply 100 and need not be dealt with immediately. However, the threshold T1a and the threshold T1b are set to a level at which it can be determined that some abnormality occurs in a component (portion) and it is better to replace the target component (abnormal portion) at some stage. The threshold T2a and a threshold T2b described below are values determined as a level at which it can be determined that it is difficult to continue the operation of the uninterruptible power supply 100 and it is better to stop the uninterruptible power supply 100 immediately.

Specifically, as shown in FIG. 7, the absolute value comparator 34a includes a deviation calculator 41, an absolute value calculator 42, a first comparator 43, a second comparator 44, and a counter 45. The deviation calculator 41 calculates the deviation C1 between the command value A and the absolute value reference value B1 and inputs the calculated deviation C1 to the absolute value calculator 42.

The absolute value calculator 42 calculates the absolute value C1a of the deviation C1 and inputs the calculated absolute value C1a to a first end (non-inverting input end) of the first comparator 43 and a first end (non-inverting input end) of the second comparator 44. The threshold T1a is input to a second end (inverting input end) of the first comparator 43. When the absolute value C1a is equal to or greater than the threshold T1a, the abnormality content information E1 (signal) is output to the analyzer 35 (see FIG. 3) and the counter 45.

The counter 45 counts the number of times a signal indicating that the absolute value C1a is equal to or greater than the threshold T1a has been acquired from the first comparator 43, and acquires (counts) the length of a period in which the signal has been acquired. The counter 45 stores the counted number of times the signal has been acquired as the abnormality occurrence frequency information E2 in the storage 12, and stores the length of the period in which the signal has been acquired as the abnormality occurrence period information E3 in the storage 12.

The threshold T2a is input to a second end (inverting input end) of the second comparator 44. When the absolute value C1a is equal to or greater than the threshold T2a, the device stop command E4 is output to the stop sequence controller 36 (see FIG. 3). When acquiring the device stop command E4, the stop sequence controller 36 stops the operation (power conversion) of the converter 3, the inverter 4, and the chopper 5.

That is, according to the present embodiment, the controller 11 performs control of continuing the operation of the converter 3, the inverter 4, and the chopper 5 when acquiring a comparison result including information indicating that the absolute value C1a of the deviation C1 between the command value A and the absolute value reference value B1 is equal to or greater than the threshold T1a, whereas the controller 11 performs control of stopping the operation of the converter 3, the inverter 4, and the chopper 5 when acquiring the comparison result including the information indicating that the absolute value C1a of the deviation C1 between the command value A and the absolute value reference value B1 is equal to or greater than the threshold T2a greater than the threshold T1a.

Note that each of the absolute value reference value B1 and the thresholds T1a and T2a is not limited to one value, but a plurality of values may be provided corresponding to each command value A.

Figure 9A:
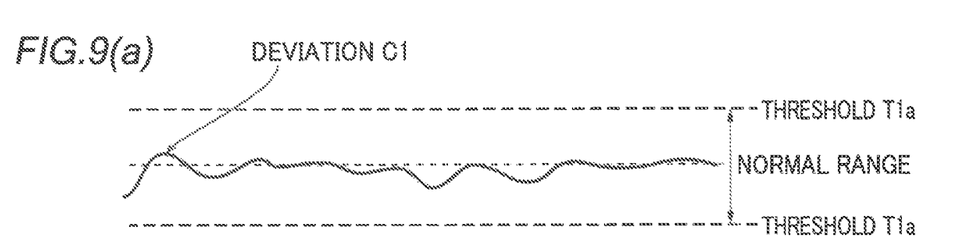
FIGS. 9(a)-9(c) are diagrams illustrating a comparison between a deviation between a command value and a reference value and a threshold according to the embodiment of the present invention.
Figure 9B:
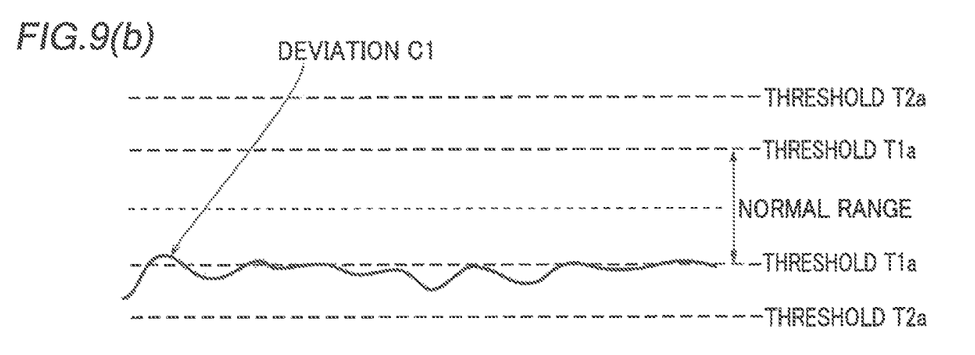
Figure 9C:
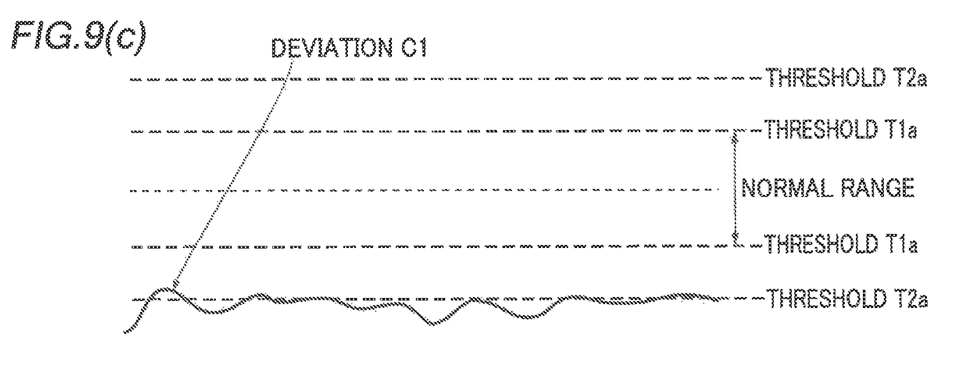

Next, FIGS. 9(a)-9(c) are examples of a comparison between the command value A and the absolute value reference value B1. An example of acquiring a comparison result indicating an abnormality of the DC AVR command A1b of the converter controller 31 as an example of the command value A is described.

Here, it is necessary to make the output power of the converter 3 and the magnitude of the power to be supplied from the inverter 4 to the load 202 substantially equal to each other in order for the converter 3 to perform maintaining control such that the voltage of the output power is constant. Therefore, assuming that the magnitude of the load 202 is constant, as shown in FIG. 9(a), the behavior (waveform) of the deviation C1 of the DC AVR command A1b is not equal to or greater than the threshold T1a although there are pulsations, but is a substantially constant value (within a normal range). In FIGS. 9(a)-9(c), not the absolute value C1a but the deviation C1 is shown for ease of description.

When an abnormality occurs in the converter current detector 22, the value (amplitude) of the deviation C1 changes irrespective of the fact that the magnitude of the load 202 is constant, as shown in FIG. 9(b). As shown in FIG. 4, in the converter controller 31, the DC AVR command A1b is set such that the converter current detection value I1 and the converter current command A1c coincide with each other, whereas an actual value of the current that flows through the converter 3 is different from a target current value when an abnormality occurs in the converter current detector 22. Due to this, the DC voltage detection value V2 varies, and thus the converter controller 31 operates so as to change the DC AVR command A1b to keep the DC voltage constant. That is, when an error occurs in the converter current detection value I1, the DC AVR command A1b is shifted by an amount corresponding to the error in order to make the DC voltage constant such that the entire uninterruptible power supply 100 is in a normal operation state.

Regarding this point, according to the present embodiment, even when the entire uninterruptible power supply 100 is in a normal operation state, an abnormal portion (an abnormality of the converter current detector 22) of the uninterruptible power supply 100 can be detected.

As shown in FIG. 9(c), when a relatively large abnormality occurs in the converter current detector 22, the DC voltage may not be kept constant by shifting the DC AVR command A1b. In this case, the deviation C1 (absolute value C1a) has a value equal to or greater than the threshold T2a. In this case, the operation of the uninterruptible power supply 100 is stopped by the stop sequence controller 36.

<Configuration Related to Comparison Between Deviation Between Pulsating Component of Command Value and Pulsation Reference Value and Threshold>

Figure 8:
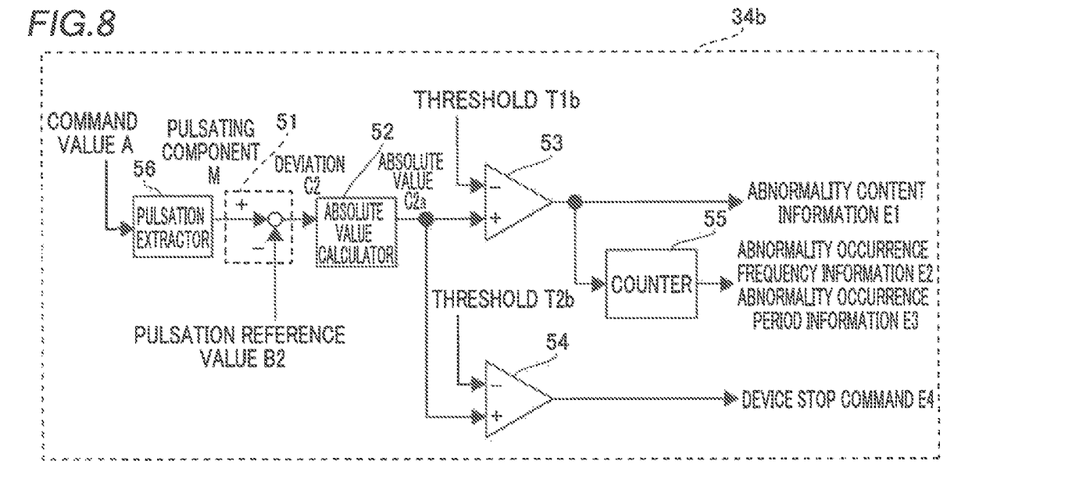
FIG. 8 is a block diagram showing the configuration of a pulsation comparator according to the embodiment of the present invention.

According to the present embodiment, as shown in FIG. 8, the pulsation comparator 34b of the controller 11 acquires a pulsating component M of the command value A as a value based on the command value A, and performs control of acquiring a deviation C2 between the pulsating component M and the pulsation reference value B2, which is a reference value of the pulsating component M, equal to or greater than the threshold T1b as a comparison result indicating an abnormality. The threshold T1b is an example of a "first threshold" in the claims.

According to the present embodiment, the comparator 34 performs control of stopping the operation of the power converters (the converter 3, the inverter 4, and the chopper 5) when acquiring a comparison result including information indicating that the deviation C2 between the pulsating component M and the pulsation reference value B2 is equal to or greater than the threshold T2b greater than the threshold T1b. The threshold T2b is an example of a "second threshold" in the claims.

Specifically, as shown in FIG. 8, the pulsation comparator 34b includes a deviation calculator 51, an absolute value calculator 52, a first comparator 53, a second comparator 54, a counter 55, and a pulsation extractor 56. The pulsation extractor 56 includes a high-pass filter or a band-pass filter, for example, and extracts (filters) the pulsating component M from the input command value A.

The deviation calculator 51 calculates the deviation C2 between the pulsating component M and the pulsation reference value B2 and inputs the calculated deviation C2 to the absolute value calculator 52. The pulsation reference value B2 is a value stored in advance in the storage 12. The absolute value calculator 52 calculates an absolute value C2a of the deviation C2 and inputs the calculated absolute value C2a to a first end of the first comparator 53 and a first end of the second comparator 54. The threshold T1b is input to a second end of the first comparator 53. When the absolute value C2a is equal to or greater than the threshold T1b, the abnormality content information E1 is output to the analyzer 35 (see FIG. 3) and the counter 55.

The counter 55 stores the number of times a signal indicating that the absolute value C1a is equal to or greater than the threshold T1b has been acquired from the first comparator 53 as the abnormality occurrence frequency information E2 in the storage 12, and stores the length of a period in which the signal has been acquired as the abnormality occurrence period information E3 in the storage 12.

The threshold T2b is input to a second end of the second comparator 54. When the absolute value C2a is equal to or greater than the threshold T2b, the device stop command E4 is output to the stop sequence controller 36 (see FIG. 3).

Figure 10A:
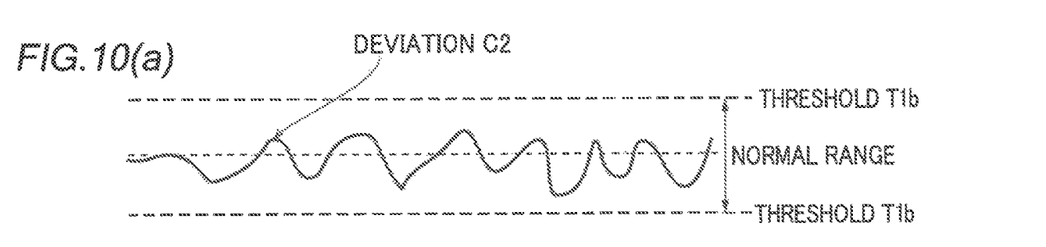
FIGS. 10(a)-10(c) are diagrams illustrating a comparison between a deviation between a pulsating component and a reference value and a threshold according to the embodiment of the present invention.
Figure 10B:
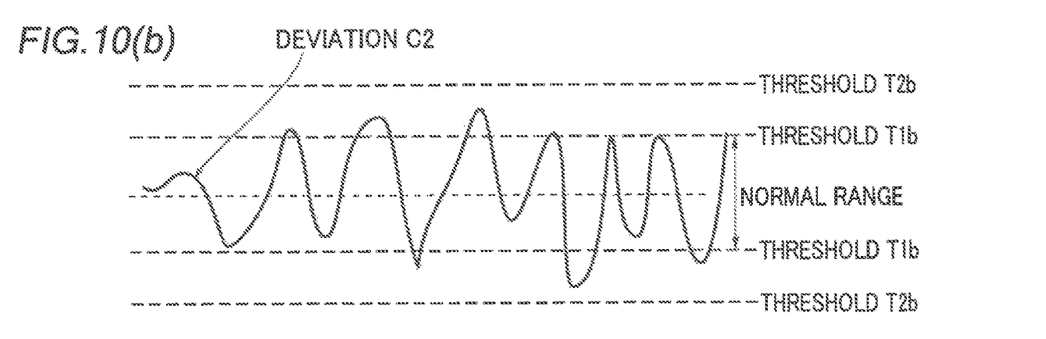
Figure 10C:
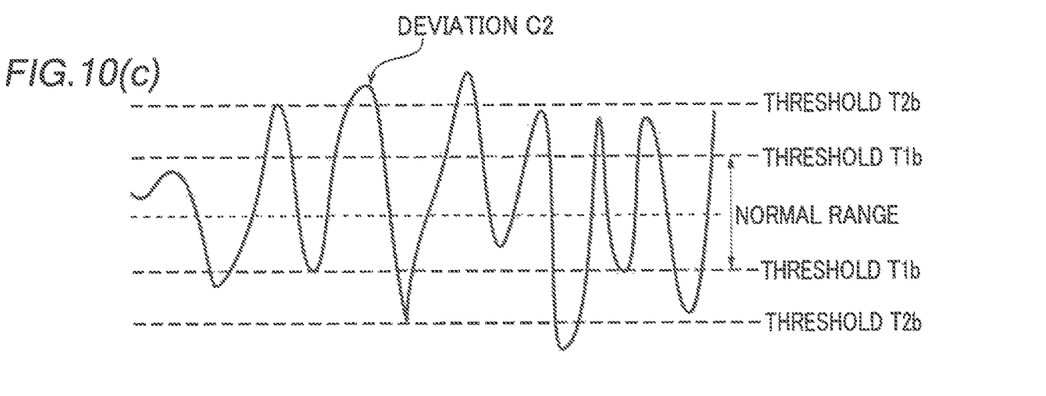

Next, FIGS. 10(a)-10(c) show examples of a comparison between the deviation C2 of the pulsating component M of the command value A and the pulsation reference value B2. An example of acquiring a comparison result indicating an abnormality of the DC AVR command A1b of the converter controller 31 as an example of the command value A is described.

FIG. 10(a) shows the normal waveform of the deviation C2. Here, an abnormality may occur in the capacitor circuit 8. For example, the capacitor 81 may deteriorate, and its capacity may be lower than a design value. In this case, only a slight disturbance causes the DC voltage to vary relatively greatly when the magnitude of the load 202 varies, for example. Then, in order to compensate for this variation, the converter controller 31 fluctuates the DC AVR command A1b at a high frequency having such an amplitude that the deviation C2 becomes equal to or greater than the threshold T1b, as shown in FIG. 10(b). Thus, the pulsation comparator 34b can detect that the capacitor circuit 8 is abnormal.

When the capacitor 81 further deteriorates and its capacity further decreases, as shown in FIG. 10(c), the deviation C2 of the DC AVR command A1b fluctuates at a high frequency having such an amplitude that the deviation C2 becomes equal to or greater than the threshold T2b. In this case, the operation of the uninterruptible power supply 100 is stopped.

<Configuration Related to Estimation of Abnormal Portion>

According to the present embodiment, the analyzer 35 of the controller 11 performs control of estimating the abnormal portion of the uninterruptible power supply 100 based on the comparison results. That is, the controller 11 estimates the abnormal portion of the uninterruptible power supply 100 based on comparisons between one or more command values A and the reference values B. Specifically, the analyzer 35 performs control of estimating the abnormal portion of the uninterruptible power supply 100 based on the type of command value A that has obtained a comparison result indicating an abnormality among the plurality of types of command value A.

Figure 11:
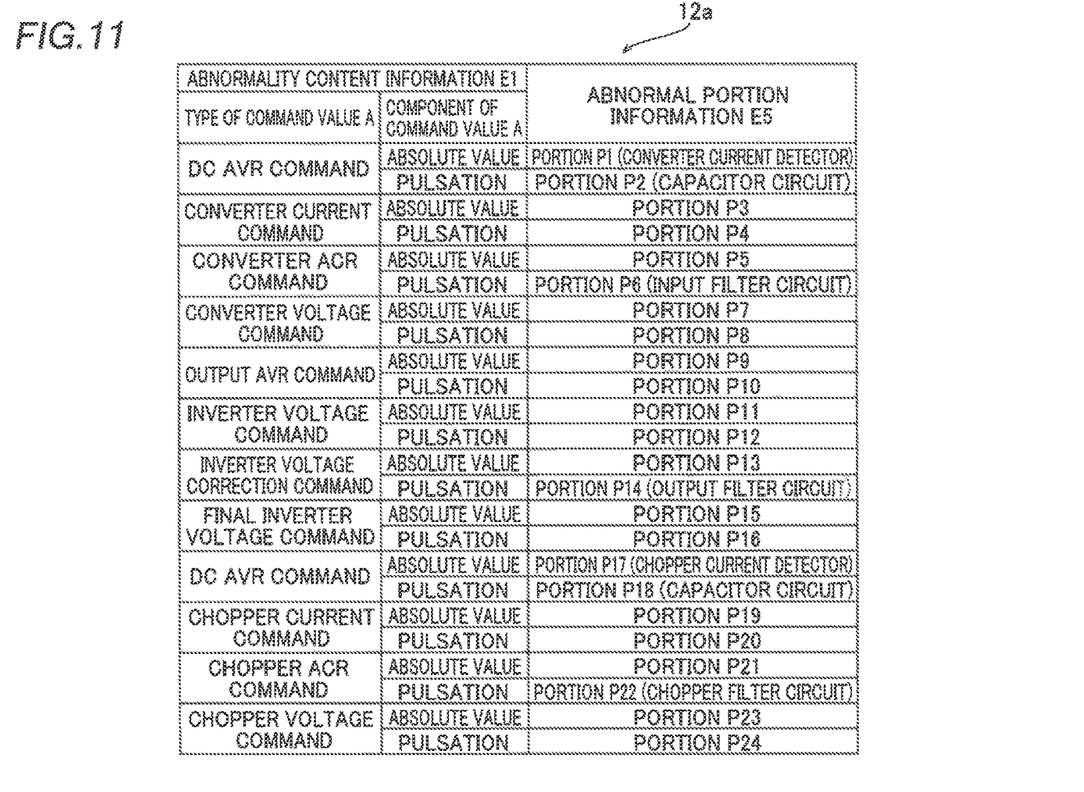
FIG. 11 is a diagram illustrating the structure of a table according to the embodiment of the present invention.

Specifically, according to the present embodiment, the analyzer 35 of the controller 11 performs control of estimating an abnormal portion of interior portions of the uninterruptible power supply 100 based on the table 12a shown in FIG. 11, in which the types of command value A and abnormal portions of the uninterruptible power supply 100 are associated with each other, and the type of command value A that has obtained the comparison result indicating an abnormality among the plurality of types of command value A.

More specifically, in the table 12a, the abnormality content information E1 and the abnormal portion information E5 are associated with each other. The abnormality content information E1 includes information about the type of command value A and information about a component of the command value A. For example, when the absolute value C1a of the DC AVR command A1b generated by the converter controller 31 is equal to or greater than the threshold T1a, the "type of command value" of the abnormality content information E1 is a "DC AVR command", and the "component of the command value" is an "absolute value". In this case, the "abnormal portion information E5" corresponding to the abnormality content information E1 is a "portion P1" and specifically the "converter current detector 22".

Referring to the table 12a, the analyzer 35 outputs the abnormal portion information E5 (information indicating any of portions P1 to P24) corresponding to the input abnormality content information E1 to the storage 12 and the display 15.

For example, when acquiring information indicating that there is an abnormality in a pulsating component of the converter ACR command A1d as the abnormality content information E1 from the comparator 34, the analyzer 35 outputs information indicating that the portion P6 (specifically the input filter circuit 6) is abnormal as the abnormal portion information E5 to the storage 12 and the display 15.

Figure 12:
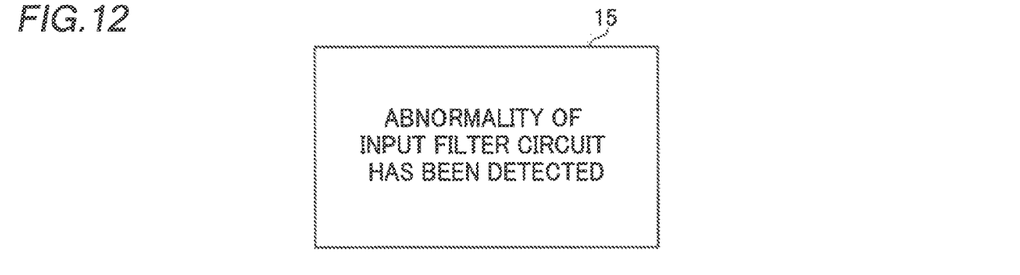
FIG. 12 is a diagram illustrating an image displayed on a display according to the embodiment of the present invention.

According to the present embodiment, as shown in FIG. 12, the display 15 displays an image showing the abnormal portion estimated (identified) by the controller 11 based on the abnormal portion information E5. For example, the display 15 displays an image for notifying the user of the abnormal portion such as "an abnormality of the input filter circuit has been detected" based on the command from the controller 11.

Here, the value of the current that flows through the converter 3 includes a high-frequency ripple component due to switching of the semiconductor element. Therefore, the ripple component (pulsating component) is included in the converter ACR command A1d calculated with reference to the converter current detection value I1. The magnitude (amplitude) of the ripple component is determined by the circuit constant of the input filter circuit 6 and the switching frequency of the semiconductor element. Here, the switching frequency is set to be constant, and thus an increase in the ripple component (pulsating component) of the converter ACR command A1d indicates a change in the circuit constant due to occurrence of an abnormality in the input filter circuit 6. Thus, an abnormality of the "pulsating component M" of the "converter ACR command A1d" corresponds to an abnormality in the "input filter circuit 6".

Similarly, with respect to the other portions (components) of the uninterruptible power supply 100, the analyzer 35 estimates (identifies) abnormal portions from abnormalities of the command values A.

For example, an abnormality of the output filter circuit 7 can be detected by monitoring a pulsating component of the inverter voltage correction command A2d. The inverter voltage correction command A2d is a correction amount calculated with reference to the inverter current detection value I2, and the inverter current detection value I2 includes a high-frequency ripple component due to switching of the semiconductor element. Thus, the inverter voltage correction command A2d, which is a result of calculation using that, also includes the same ripple component. The magnitude (amplitude) of this ripple component is determined by the circuit constant of the output filter circuit 7 and the switching frequency of the semiconductor element, and thus an increase in the ripple component indicates a change in the circuit constant of the output filter circuit 7, and it can be determined that an abnormality has occurred in the output filter circuit 7.

The chopper current detection value I3 also includes a high-frequency ripple component due to switching of the semiconductor element, and thus the chopper ACR command A3d, which is a result of calculation using that, also includes the same ripple component. Using the same principles, an abnormality of the chopper filter circuit 10 can be determined by monitoring a pulsating component of the chopper ACR command A3d. When an abnormality occurs in the chopper current detector 27 and a detection error occurs, the chopper controller 33 changes the DC AVR command A3b to keep the DC voltage constant, similarly to the operation of the converter controller 31. Therefore, the abnormality of the chopper current detector 27 can be determined by monitoring an absolute value of the DC AVR command A3b. Similarly to the operation of the converter controller 31, the abnormality of the capacitor circuit 8 can be determined by monitoring a pulsating component of the DC AVR command A3b.

Advantageous Effects of Present Embodiment

According to the present embodiment, the following advantageous effects are achieved.

According to the present embodiment, as described above, the controller 11 compares the command value A with the reference values B (the absolute value reference value B1 and the pulsation reference value B2), which serve as a reference for the command value A. Accordingly, it can be determined that an abnormality has occurred in a portion of the uninterruptible power supply 100 corresponding to the command value A in which an abnormality has occurred by determining whether or not the command value A is abnormal based on the comparison results. That is, it can be estimated that an abnormality has occurred in the detector 9 that generates the command value A or a detection target (any of the portions P1 to P24) in which the voltage value or the current value is detected by the detector 9. Thus, unlike the case in which the presence or absence of an abnormality of the entire uninterruptible power supply 100 is determined based on the input current or the output voltage of the entire uninterruptible power supply 100, an abnormal portion of interior portions of the uninterruptible power supply 100 can be estimated, and thus the abnormal portion of the uninterruptible power supply 100 can be quickly identified. Consequently, even when an abnormality occurs in the uninterruptible power supply 100, an abnormal portion can be quickly identified, and thus the uninterruptible power supply 100 can be quickly restored from an abnormal state to a normal state.

According to the present embodiment, as described above, the controller 11 estimates an abnormal portion of the uninterruptible power supply 100 based on the comparison between one or more command values A and the reference values B. Accordingly, the uninterruptible power supply 100 itself can estimate its abnormal portion, and thus the abnormal portion of the uninterruptible power supply 100 can be identified without providing a device that estimates an abnormal portion separately from the uninterruptible power supply 100. That is, there is no need for the user or the maintenance worker to estimate the abnormal portion.

According to the present embodiment, as described above, the controller 11 estimates an abnormal portion of interior portions of the uninterruptible power supply 100 based on the table 12a in which the types of command value A and the abnormal portions of the uninterruptible power supply 100 are associated with each other and the command value A indicating an abnormality among the command values A. Accordingly, by using the table 12a, an abnormal portion corresponding to the type of command value A, which has obtained a comparison result indicating an abnormality, can be easily and quickly estimated without performing complex calculation, for example.

According to the present embodiment, as described above, the uninterruptible power supply 100 includes the display 15 that displays the abnormal portion of the interior portions of the uninterruptible power supply 100 estimated by the controller 11. Accordingly, the user can visually recognize the image (see FIG. 12) showing the abnormal portion, and thus the user can easily recognize the abnormal portion.

According to the present embodiment, as described above, the controller 11 estimates the portion corresponding to the command value A as an abnormal portion when the deviation C1 between the command value A and the reference value B is equal to or greater than the threshold T1a. Accordingly, by using the threshold T1a, it can be easily determined whether or not the value based on the command value A is an abnormal value with respect to the reference value B. Furthermore, the deviation between the value based on the command value A and the reference value B is calculated such that only a component (a component for determining an abnormality) of the deviation C1 of the value based on the command value A from the reference value B can be compared with the threshold T1a. Thus, components other than the component for determining an abnormality are not included, and thus it can be more easily determined whether or not the value based on the command value A is an abnormal value with respect to the reference value B.

According to the present embodiment, as described above, the controller 11 estimates the portion corresponding to the pulsating component M as an abnormal portion when the deviation C2 between the pulsating component M and the pulsation reference value B2 is equal to or greater than the threshold T2a. Here, depending on a portion (component) of the uninterruptible power supply 100, the pulsating component M of the command value A may be changed to an abnormal value when an abnormality occurs in that portion. In view of this point, the uninterruptible power supply 100 is configured as described above in the present embodiment such that an abnormal portion of the uninterruptible power supply 100 can be easily identified.

According to the present embodiment, as described above, the controller 11 stops the operation of the converter 3, the inverter 4, and the chopper 5 (hereinafter referred to as the power converters) when the deviation C1 or C2 (absolute value C1a or C1b) between the command value A and the reference value B becomes equal to or greater than the threshold T2a or T2b after the deviation C1 or C2 becomes equal to or greater than the threshold T1a or T1b and the controller 11 continues the operation of the power converters. Accordingly, even when an abnormal portion exists in the uninterruptible power supply 100, the operation of the power converters can be continued when the deviations C1 and C2 are less than the thresholds T2a and T2b, respectively, and thus an unnecessary stop of the operation of the power converters can be significantly reduced or prevented. When the deviation C1 or C2 is equal to or greater than the threshold T2a or T2b, the operation of the power converters is stopped, and thus the operation of the power converters can be appropriately stopped when the operation of the power converters should be stopped while an unnecessary stop of the operation of the power converters is significantly reduced or prevented.

Modified Examples

The embodiments disclosed this time must be considered as illustrative in all points and not restrictive. The scope of the present invention is not shown by the above description of the embodiment but by the scope of claims for patent, and all modifications (modified examples) within the meaning and scope equivalent to the scope of claims for patent are further included.

For example, while the uninterruptible power supply includes three power converters of the converter, the inverter, and the chopper in the aforementioned embodiment, the present invention is not restricted to this. That is, the uninterruptible power supply may alternatively include at least one of the power converters of the converter, the inverter, and the chopper.

While the detector includes the input voltage detector, the converter current detector, the DC voltage detector, the inverter current detector, the output voltage detector, the battery voltage detector, and the chopper current detector in the aforementioned embodiment, the present invention is not restricted to this. That is, the detector may alternatively include at least one of the input voltage detector, the converter current detector, the DC voltage detector, the inverter current detector, the output voltage detector, the battery voltage detector, and the chopper current detector, or may alternatively include a detector in addition to the above.

While the controller (control device) that controls the operation of the power converters and the controller that performs control of estimating an abnormal portion are configured as the same controller in the aforementioned embodiment, the present invention is not restricted to this. That is, a controller (control device) that estimates an abnormal portion may alternatively be provided separately from the controller (control device) that controls the operation of the power converters.

While the controller is illustrated at a position separate from the power converters (the converter, the inverter, and the chopper), as shown in FIG. 1 in the aforementioned embodiment, the present invention is not restricted to this. That is, a controller may alternatively be provided in each of the power converters (the converter, the inverter, and the chopper). In other words, in each of the power converters, the controller may alternatively estimate an abnormal portion.

While referring to the table, the analyzer acquires the abnormal portion information based on the abnormality content information acquired from the comparator in the aforementioned embodiment, the present invention is not restricted to this. That is, the analyzer may alternatively generate the abnormal portion information from the abnormality content information by performing predetermined calculation without using the table.

While the image showing one abnormal portion is displayed on the display, as shown in FIG. 12 in the aforementioned embodiment, the present invention is not restricted to this. That is, when there is a plurality of abnormal portions, an image showing the plurality of abnormal portions may alternatively be displayed on the display.

While the threshold is illustrated as a constant value, as shown in FIGS. 9 and 10 in the aforementioned embodiment, the present invention is not restricted to this. For example, the threshold may alternatively be varied depending on the magnitude of the load. That is, when the load is relatively large, the threshold may alternatively be set to be relatively large, and when the load is relatively small, the threshold may alternatively be set to be relatively small.

While when the deviation is equal to or greater than the thresholds T1a and T1b, the operation of the power converters is continued in the aforementioned embodiment, the present invention is not restricted to this. For example, when the number of times indicated by the abnormality occurrence frequency information stored in the storage is equal to or more than a predetermined number of times, or when the period indicated by the abnormality occurrence period information is equal to or longer than a predetermined period, the controller may alternatively perform control of stopping the power converters.

Figure 13:
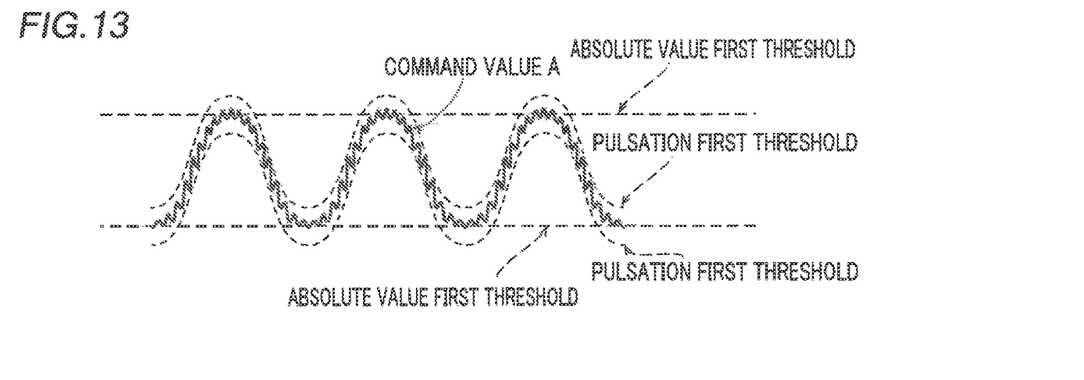
FIG. 13 is a diagram illustrating a comparison between a command value and a threshold according to a modified example of the embodiment of the present invention.

While the controller compares the component of the absolute value of the command value and the pulsating component of the command value separately with the reference values (see FIGS. 9 and 10) in the aforementioned embodiment, the present invention is not restricted to this. For example, as shown in FIG. 13, the controller may alternatively determine whether or not the command value A including both the pulsating component and the absolute value component is equal to or greater than each of thresholds (an absolute value first threshold and a pulsation first threshold). In this case, each of the thresholds corresponds to the reference value. Furthermore, the pulsation first threshold is not a constant value but is set to have a waveform in which the frequency and the phase are synchronized with the waveform of the command value A.

What is claimed is:

1. An uninterruptible power supply comprising:
    a power converter that converts input power into output power;
    a detector that detects a voltage value or a current value in an interior portion of an uninterruptible power supply body; and
    a controller that controls the power converter based on the detected voltage value or current value and generates one or more command values, wherein
    the controller compares the one command value with one or more predetermined reference values respectively, corresponding to the one command value, or the command values with the predetermined reference values, respectively, corresponding thereto.

2. The uninterruptible power supply according to claim 1, wherein the controller estimates an abnormal portion in the uninterruptible power supply body based on comparison between the one command value and the one or more predetermined reference values, or between the command values with the predetermined reference values.

3. The uninterruptible power supply according to claim 2, wherein the controller estimates the abnormal portion in the uninterruptible power supply body based on a table in which the one or more command values and abnormal portions in the uninterruptible power supply body corresponding to the one or more command values are associated with each other and the one or more command values indicating abnormalities among the one or more command values.

4. The uninterruptible power supply according to claim 2, further comprising a display that displays the abnormal portion in the uninterruptible power supply body estimated by the controller.

5. The uninterruptible power supply according to claim 2, wherein the controller estimates the interior portion of the uninterruptible power supply body corresponding to the one or more command values as the abnormal portion when deviation between the one command value and the one or more predetermined reference values corresponding to the one command value, or between the command values and the predetermined reference values are equal to or greater than a first threshold.

6. The uninterruptible power supply according to claim 5, wherein the controller estimates, as the abnormal portion, the interior portion of the uninterruptible power supply body corresponding to a pulsating component of the one or more command values when deviation between the pulsating component of the one or more command values and the one or more predetermined reference values corresponding to the pulsating component of the one or more command values is equal to or greater than the first threshold.

7. The uninterruptible power supply according to claim 5, wherein the controller stops operation of the power converter when the deviation between the one command value and the one or more predetermined reference values, or between the command values and the predetermined reference values becomes equal to or greater than a second threshold greater than the first threshold after the deviation between the one command value and the one or more predetermined reference values, or between the command values and the predetermined reference values becomes equal to or greater than the first threshold and the controller continues the operation of the power converter.

* * * * *